United States Patent

Dagh et al.

[11] Patent Number: 5,507,367
[45] Date of Patent: Apr. 16, 1996

[54] WHEEL HUB AND BRAKE DISC ARRANGEMENT FOR HEAVY TRUCKS

[75] Inventors: Ingemar Dagh, Hisingsbacka; Jan-Olof Bodin, Alingsås, both of Sweden

[73] Assignee: AB Volvo, Gothenburg, Sweden

[21] Appl. No.: 256,777

[22] PCT Filed: Jan. 22, 1993

[86] PCT No.: PCT/SE93/00044

§ 371 Date: Sep. 14, 1994

§ 102(e) Date: Sep. 14, 1994

[87] PCT Pub. No.: WO93/14946

PCT Pub. Date: Aug. 5, 1993

[30] Foreign Application Priority Data

Jan. 24, 1992 [SE] Sweden .................... 9200203

[51] Int. Cl.⁶ .............................. B60B 27/02; F16D 65/12
[52] U.S. Cl. ................. 188/18 A; 188/218 XL; 188/264 AA
[58] Field of Search ...................... 188/114, 71.6, 188/264 R, 264 A, 264 AA, 264 G, 18 A; 304/6.91, 6.3, 105.1

[56] References Cited

U.S. PATENT DOCUMENTS

| | | | |
|---|---|---|---|
| 2,181,988 | 12/1939 | Davis | 188/71.6 |
| 2,486,144 | 10/1949 | Frank | 188/264 A X |
| 4,503,944 | 3/1985 | Burckhardt et al. | 188/71.6 |
| 4,620,616 | 11/1986 | Martin | 188/264 AA X |
| 4,700,813 | 10/1987 | Rath | 188/264 AA X |

FOREIGN PATENT DOCUMENTS 0850770 10/1960 United Kingdom ............ 188/264 AA

Primary Examiner—Robert J. Oberleitner
Assistant Examiner—Peter M. Poon
Attorney, Agent, or Firm—Young & Thompson

[57] ABSTRACT

Wheel hub rotatably carried on a shaft portion, which hub presents a region to which a brake disc is non-rotatably affixed, wherein a circular channel (23) surrounding the shaft portion, open on one side of the hub (6), is provided in the hub (6) radially inside of that region. The wheel hub (6) comprises a substantially cylindrical hub section (32) which merges into a radial flange portion (30) to which a wheel (31) is intended to be securely screwed. The circular channel (23) extends through the entire cylindrical section up to the flange portion. The circular channel (23) is open towards the end of the cylindrical hub section which faces away from the flange portion.

7 Claims, 1 Drawing Sheet

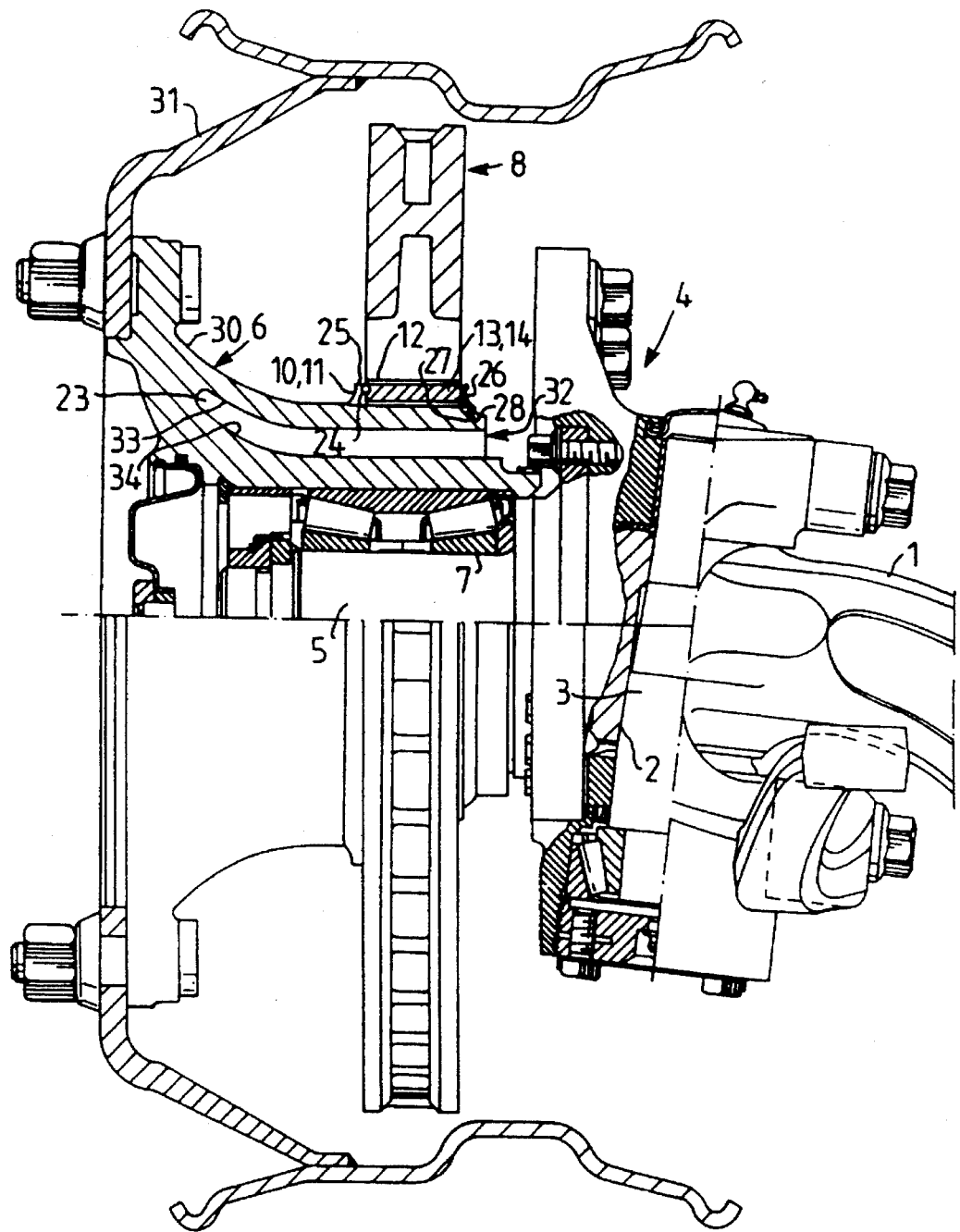

WHEEL HUB AND BRAKE DISC ARRANGEMENT FOR HEAVY TRUCKS

The present invention relates to a wheel hub and brake disc arrangement for a vehicle wheel, comprising a hub rotatably carried on a shaft portion and presenting a region to which a brake disc is non-rotatably affixed.

Disc brakes have previously predominantly only been used for cars and commercial vehicles up to about 16 tons in weight. For the heaviest class of truck, drum brakes have until now been almost exclusively used due, among other reasons, to the extremely high braking torque (around 2000 kpm) in combination with the brake shoes which apply the braking effect creating problems. More specifically, these problems are due to two aspects. Firstly, the intense heating up of the brake disc friction surfaces to a temperature which inevitably is higher than the temperature of the disc hub subjects the hub to thermal stresses which may cause the hub to fracture. Secondly, heating of the disc results in heat transfer from the disc via the hub to internal components which should not be exposed to temperature increases, for example the hub's bearing assembly. Both these factors contribute to the creation of large thermal stresses, which has restricted the use to those applications in which the temperature of the disc could be limited to an acceptable level.

The object of the present invention can generally be said to be to develop a hub and brake disc arrangement which can replace previously employed drum brakes for the heaviest class of vehicles.

More precisely, the object is to provide a hub and brake disc arrangement which is so formed that heat-sensitive components, such as bearings or the like, are not subjected to damaging thermal loads during extreme heating of the brake disc under braking. This is achieved in accordance with the present invention by the provision of a circular channel, open on one side of the hub, located in the hub radially inside of the brake disc supporting region. The circular channel serves to restrict heat transfer from the disc to heat-sensitive components, such as bearings and the like, located radially inwardly of the disc.

The invention will be described in greater detail by way of example and will reference to the attached drawing which shows a partial sectional elevational view of a wheel axle with a hub and brake disc arrangement according to the invention.

In the drawing, reference numeral 1 denotes an outer end of a rigid front axle of a truck. The end of the axle presents a conical recess 2 in which a king pin 3 is affixed. A stub axle assembly 4 is pivotally carried on the king pin 3. The stub axle assembly 4 comprises a stub axle 5 on which a wheel hub 6 is carried by means of a bearing assembly 7. The hub 6 carries a brake disc 8 and the stub axle assembly 4 carries a caliper or actuation mechanism (not shown).

Instead of attaching the brake disc to the hub by means of the previous most common method, i.e. securely screwing the disc to a flange on the hub, according to the embodiment of the present invention the disc is affixed to the hub by means of an interlocking connection.

In the shown embodiment the disc 8 is interlockingly affixed to the hub 6. To achieve this, the hub 6 is provided with a central region which has a cross section which deviates from a true circle. More exactly, the region is provided with closely spaced V-shaped ridges 10 and troughs 11. The radial inner hub region 12 of the brake disc 8 is provided with corresponding troughs 13 and ridges 14 which are adapted to cooperate with the ridges 10 and troughs 11 of the hub.

In order to restrict heat transfer during heating of the brake disc 8 from the disc through the hub 6 to components which should not be subjected to large thermal stresses, for example the bearing 7 whose thermal expansion must be kept to a low level, a circular channel 23 is provided in the hub 6 radially inside of the brake disc supporting region having the ridges 10. The circular channel extends from the end of the hub facing the king pin 3 to a securing flange 30 for the wheel 31, and has a width which corresponds to approximately one third of the thickness of the cylindrical section 32 of the hub 6. In this manner a considerably increased heat transfer path from the disc 8 to the bearing is obtained compared to a solid hub in which the heat transfer path is purely radial. In the shown embodiment the two concentric parts 33 and 34 of the hub have essentially the same axial extension since the bearing 7 is located directly radially inside of the disc 8. In an embodiment having two separate bearings instead of a single bearing assembly (not shown), and in which the two bearings are axially displaced outwardly towards the wheel, the inner hub part 34 can be shorter than the outer since the inner hub part 34 does not need to extend further than the inner bearing's axial inner end.

The disc 8 is affixed to the hub 6 by means of a lock ring 25 located in a groove 24 in the ridges 10, a spring-washer 26 and a lock ring 28 located in a groove 27 formed towards the inner end of the hub.

We claim:

1. Wheel hub rotatably carried on a shaft portion, which hub presents a region to which a brake disc is non-rotatably affixed, wherein a circular channel (23) surrounding said shaft portion, open on one side of the hub (6), is provided in the hub (6) radially inside of said region.

2. Arrangement according to claim 1, wherein the wheel hub (6) comprises a substantially cylindrical hub section (32) which merges into a radial flange portion (30) to which a wheel (31) is intended to be securely screwed, and wherein the circular channel (23) extends through the entire cylindrical section up to the flange portion.

3. Arrangement according to claim 2, wherein the circular channel (23) is open towards the end of the cylindrical hub section which faces away from the flange portion.

4. Arrangement according to claim 2, wherein the circular channel (23) has a width which corresponds to approximately one third of the thickness of the cylindrical section (32) of the hub (6).

5. Arrangement according to claim 2, wherein said brake disc supporting region of the hub is provided with closely spaced V-shaped ridges (10) and troughs (11) which extend essentially up to the end of the hub section which faces away from the flange portion (30).

6. Arrangement according to claim 1, wherein the circular channel (23) is located radially externally of a bearing assembly (7) which is carried on a stub axle (5).

7. Arrangement according to claim 6, wherein the brake disc supporting region of the hub and the bearing assembly (7) lie substantially in a common radial plane.

* * * * *